United States Patent
Li et al.

(10) Patent No.: US 11,463,530 B2
(45) Date of Patent: Oct. 4, 2022

(54) SESSION PROCESSING METHOD, APPARATUS, AND SYSTEM

(71) Applicant: HUAWEI TECHNOLOGIES CO., LTD., Guangdong (CN)

(72) Inventors: Yongcui Li, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 16/884,356

(22) Filed: May 27, 2020

(65) Prior Publication Data

US 2020/0287975 A1  Sep. 10, 2020

Related U.S. Application Data

(63) Continuation of application No. PCT/CN2018/111168, filed on Oct. 22, 2018.

(30) Foreign Application Priority Data

Nov. 27, 2017  (CN) .................... 201711201686.0

(51) Int. Cl.
*H04L 12/14* (2006.01)
*H04L 67/146* (2022.01)
(Continued)

(52) U.S. Cl.
CPC .......... *H04L 67/146* (2013.01); *H04L 12/14* (2013.01); *H04L 41/0893* (2013.01); *H04L 69/329* (2013.01); *H04M 15/66* (2013.01)

(58) Field of Classification Search
CPC ... H04L 67/146; H04L 12/14; H04L 41/0893; H04L 69/329; H04L 12/1407; H04M 15/66; H04W 4/24
See application file for complete search history.

(56) References Cited

U.S. PATENT DOCUMENTS

2012/0155457 A1  6/2012  Yi et al.
2019/0053104 A1*  2/2019  Qiao ...................... H04L 47/20
(Continued)

FOREIGN PATENT DOCUMENTS

CN         1878388 A      12/2006
CN       101090567 A      12/2007
(Continued)

OTHER PUBLICATIONS

Nokia, Nokia Shanghai Bell, NTT DOCOMO, "OI#20a: 23.501/5.6.7: case of applications that do not support application mobility," SA WG2 Meeting #124, S2-178253, Reno, NV, USA, Nov. 27-Dec. 1, 2017, 5 pages.
(Continued)

*Primary Examiner* — Shirley X Zhang
(74) *Attorney, Agent, or Firm* — Fish & Richardson P.C.

(57) ABSTRACT

A session processing method comprising: receiving, by a policy control function network element from an application function network element, a request for determining policy information, wherein the request comprises a continuity request of an application (APP); sending, by the policy control function network element, the policy information to a session management function network element; receiving, by the session management function network element, the policy information from the policy control function network element; and processing, by the session management function network element, a session according to the policy information.

14 Claims, 6 Drawing Sheets

(51) Int. Cl.
  *H04L 41/0893* (2022.01)
  *H04L 69/329* (2022.01)
  *H04M 15/00* (2006.01)

(56) References Cited

U.S. PATENT DOCUMENTS

| | | | | |
|---|---|---|---|---|
| 2019/0297538 | A1* | 9/2019 | Keller | H04W 36/0022 |
| 2020/0053803 | A1* | 2/2020 | Youn | H04L 67/148 |
| 2020/0280562 | A1* | 9/2020 | Salkintzis | H04L 67/306 |

FOREIGN PATENT DOCUMENTS

| | | |
|---|---|---|
| CN | 101227728 A | 7/2008 |
| CN | 101378586 A | 3/2009 |
| CN | 101827322 A | 9/2010 |
| CN | 102904856 A | 1/2013 |
| CN | 105636008 A | 6/2016 |
| CN | 107018542 A | 8/2017 |
| EP | 3171542 A1 | 5/2017 |

OTHER PUBLICATIONS

3GPP TS23.501-150 Draft,3rd Generation Partnership Project,Technical Specification Group Services and System Aspects, System Architecture for the 5S System, Stage 2 (Release 15), Nov. 13, 2017, 170 pages.

3GPP TS 23.501 V1.4.0 (Sep. 2017),3rd Generation Partnership Project,Technical Specification Group Services and System Aspects, System Architecture for the 5G System,Stage 2 (Release 15), 151 pages.

3GPP TS 23.502 V1.2.0 (Sep. 2017),3rd Generation Partnership Project, Technical Specification Group Services and System Aspects,Procedures for the 5G System, Stage 2 (Release 15), 165 pages.

3GPP TS 23.203 V15.0.0 (Sep. 2017),3rd Generation Partnership Project,Technical Specification Group Services and System Aspects,Policy and charging control architecture(Release 15), 257 pages.

3GPP TS 23.503 V0.3.0 (Sep. 2017),3rd Generation Partnership Project,Technical Specification Group Services and System Aspects,Policy and Charging Control Framework for the 5G System,Stage 2 (Release 15), 27 pages.

3GPP TS 23.503 V0.4.0 (Nov. 2017),3rd Generation Partnership Project,Technical Specification Group Services and System Aspects,Policy and Charging Control Framework for the 5G System,Stage 2 (Release 15), 53 pages.

Extended European Search Report issued in European Application No. 18882188.8 dated Aug. 18, 2020, 7 pages.

PCT International Search Report and Written Opinion in International Application No. PCT/CN2018/111,168, dated Jan. 7, 2019, 15 pages (With English Translation).

Office Action issued in Chinese Application No. 201711201686.0 dated Mar. 25, 2021, 9 pages.

Office Action issued in Indian Application No. 202037023731 dated Jul. 13, 2021, 7 pages.

* cited by examiner

SESSION PROCESSING METHOD, APPARATUS, AND SYSTEM

CROSS-REFERENCE TO RELATED APPLICATIONS

This application is a continuation of International Patent Application No. PCT/CN2018/111168, filed on Oct. 22, 2018, which claims priority to Chinese Patent Application No. 201711201686.0, filed on Nov. 27, 2017. The disclosures of the aforementioned applications are hereby incorporated by reference in their entireties.

TECHNICAL FIELD

The present invention relates to the field of communications technologies, and in particular, to a session processing method, apparatus, and system.

BACKGROUND

Currently, when user equipment starts an application (Application, APP), the user equipment obtains a requirement of the APP based on a user equipment policy. The requirement of the APP is a requirement that a session established between the user equipment and an APP server needs to meet when the user equipment uses the APP, and may also be referred to as a requirement of the APP server. For example, the requirement of the APP includes at least one of a session and service continuity (Session and service continuity, SSC) mode, a data network name (Data Network Name, DNN) corresponding to a session, a network slice type corresponding to a session, and the like. Then, the user equipment determines whether a session that meets the requirement of the APP exists in existing sessions. If a session that meets the requirement of the APP exists in the existing sessions, the user equipment reuses the session when starting the APP. If no session that meets the requirement of the APP exists in the existing sessions, the user equipment newly establishes a session when starting the APP.

An application function (Application Function, AF) network element can provide a correct continuity requirement of the APP. However, in the prior art, a continuity requirement of the APP that is provided by the AF is not considered in setting of a user equipment policy. Therefore, an SSC mode in the user equipment policy is not necessarily correct, and as a result, the session that the user equipment determines, based on the user equipment policy, to reuse or newly establish does not necessarily meet the continuity requirement of the APP, and consequently, user experience is reduced. As shown in FIG. 1, user equipment includes an APP 1 and an APP 2, and a server of the APP 1 and a server of the APP 2 are in a data network (Data Network, DN). There are two sessions between the user equipment and the DN: a session 1 and a session 2. An SSC mode supported by the session 1 is a mode 2, and an SSC mode supported by the session 2 is a mode 1. The user equipment implements transmission of an APP 1 service flow between the user equipment and the APP 1 server by using the session 1. When the user equipment starts the APP 2, the user equipment determines, based on a user equipment policy, to reuse the session 1, reuse the session 2, or newly establish a session 3. According to the prior art, a requirement of the APP 2 that is obtained by the user equipment based on the user equipment policy is the SSC mode 2. Therefore, when the user equipment starts the APP 2, the session 1 is reused. However, an SSC mode corresponding to a continuity requirement of the APP 2 in the AF is an SSC mode 3. Consequently, the session 1 cannot meet the continuity requirement of the APP 2, and when an APP 2 service flow is transmitted between the user equipment and the APP 2 server by using the session 1, user experience is reduced.

SUMMARY

Embodiments of the present invention provide a session processing method, apparatus, and system.

According to one aspect, an embodiment of this application provides a session processing method. The method includes: receiving, by a policy control function network element (for example, a PCF network element), request information from an application function network element (for example, an AF network element), where the request information includes a continuity requirement of an APP; and sending, by the policy control function network element, first policy information to user equipment, where the first policy information includes an SSC mode of the APP, the first policy information is associated with the continuity requirement of the APP, and the first policy information is for determining whether to reuse or newly establish a session.

According to the foregoing method, the user equipment may obtain the first policy information related to the continuity requirement of the APP. The user equipment performs session processing based on the first policy information when starting the APP: if a session that meets the SSC mode in the first policy information exists in existing sessions of the user equipment, the user equipment reuses the session; or if no session that meets the SSC mode in the first policy information exists in the existing sessions of the user equipment, the user equipment directly initiates a session establishment procedure. Because the first policy information is related to the continuity requirement of the APP, the session reused or newly established by the user equipment based on the first policy information meets the continuity requirement for communication between the user equipment and a server of the APP, and therefore, user experience is improved.

In a possible design, the policy control function network element determines the SSC mode of the APP based on the request information. The continuity requirement includes that the APP does not need continuity, the APP needs internet protocol IP address continuity, or the APP supports upper-layer service continuity. Therefore, based on different continuity requirements of the APP in the request information, the policy control function network element may provide, for the user equipment, the first policy information including the SSC mode of the APP.

In a possible design, if the continuity requirement is that the APP does not need continuity, the policy control function network element determines that the SSC mode of the APP is a second mode. In the second mode, a service connection between the APP server of the APP and the user equipment is allowed to be disconnected. Therefore, based on the requirement, in the request information, that the APP does not need continuity, the policy control function network element determines, for the user equipment, the first policy information including the second SSC mode, so that the user equipment can reuse a session that meets the second SSC mode.

In a possible design, the policy control function network element sends second policy information to a session management function network element. The second policy information is a multi-homing offload policy or a ULCL offload policy. Therefore, based on the requirement, in the request information, that the APP does not need continuity, the policy control function network element may provide the second policy information for the session management function network element, and perform multi-homing offload or ULCL offload processing on a session on a premise that the session meets the requirement that the APP does not need continuity, so that a session path may be shortened, and transmission efficiency is improved.

In a possible design, if the continuity requirement is that the APP supports upper-layer service continuity, the policy control function network element determines that the SSC mode of the APP is a third mode. In the third mode, a service connection between the APP server and the user equipment is reserved, and an IP address of the APP is allowed to change. Therefore, based on the requirement, in the request information, that the APP supports upper-layer service continuity, the policy control function network element determines, for the user equipment, the first policy information including the third SSC mode, so that the user equipment can reuse a session that meets the third SSC mode.

In a possible design, the policy control function network element sends second policy information to the session management function network element. The second policy information is a multi-homing offload policy. Therefore, based on the requirement, in the request information, that the APP supports upper-layer service continuity, the policy control function network element may provide the second policy information to the session management function network element, and perform multi-homing offload processing on a session on a premise that the session meets the requirement that the APP supports upper-layer service continuity, so that a session path may be shortened, and transmission efficiency is improved.

In a possible design, if the continuity requirement is that the APP needs IP address continuity, the policy control function network element determines that the SSC mode of the APP is a first mode. In the first mode, a session connection between the APP server and the user equipment is reserved, and an IP address of the APP remains unchanged. Therefore, based on the requirement, in the request information, that the APP needs IP address continuity, the policy control function network element determines, for the user equipment, the first policy information including the first SSC mode, so that the user equipment can reuse a session that meets the first SSC mode.

In a possible design, the request information further includes indication information for indicating whether the APP server supports context migration with another APP server. Therefore, the policy control function network element may provide the second policy information for the session management function network element based on the requirement that the APP needs IP address continuity and the indication information indicating whether the APP server supports context migration with another APP server that are in the request information.

In a possible design, if the indication information indicates that the APP server supports context migration with the another APP server, the policy control function network element sends second policy information to the session management function network element, and the second policy information is a ULCL offload policy. Therefore, based on the requirement that the APP needs IP address continuity and the indication information indicating that the APP server supports context migration with the another APP server that are in the request information, the policy control function network element may provide the second policy information for the session management function network element, and performs ULCL offload processing on a session on a premise that the session meets the requirement that the APP needs IP address continuity, so that a session path may be shortened, and transmission efficiency is improved.

In a possible design, if the indication information indicates that the APP server does not support context migration with the another APP server, the policy control function network element sends second policy information to the session management function network element, and the second policy information is to keep an anchor user plane function network element for accessing the APP server unchanged. Therefore, based on the requirement that the APP needs IP address continuity and the indication information indicating that the APP server does not support context migration with the another APP server that are in the request information, the policy control function network element may provide the second policy information for the session management function network element, and keeps the anchor user plane function network element that accesses the APP server and that is in a session unchanged on a premise that the session meets the requirement that the APP needs IP address continuity, so that a session path may be shortened, and transmission efficiency is improved.

According to another aspect, this application further discloses a session processing method. The method includes: determining, by an application function network element (for example, an AF network element), a continuity requirement of an APP; and sending, by the application function network element, request information to a policy control function network element (for example, a PCF network element). The request information includes the continuity requirement, and the request information is for determination of first policy information. The first policy information includes an SSC mode of the APP, the first policy information is associated with the continuity requirement of the APP, and the first policy information is for determining whether to reuse or newly establish a session.

According to the foregoing method, the application function network element may provide the continuity requirement of the APP for the policy control function network element, so that the first policy information sent by the policy control function network element to user equipment is related to the continuity requirement of the APP. A session reused or newly established by the user equipment based on the first policy information meets the continuity requirement for communication between the user equipment and a server of the APP, and therefore, user experience is improved.

In a possible design, the continuity requirement includes that the APP does not need continuity, the APP needs IP address continuity, or the APP supports upper-layer service continuity. Therefore, based on different continuity requirements of the APP in the request information, the policy control function network element may provide, for the user equipment, the first policy information including the SSC mode of the APP.

In a possible design, when the continuity requirement is that the APP needs internet protocol IP address continuity, the request information further includes indication information for indicating whether the APP server supports context migration with another APP server. Therefore, the policy control function network element may provide second policy information to the session management function network element (for example, an SMF network element) based on the requirement that the APP needs IP address continuity and the indication information indicating whether the APP server supports context migration with another APP server that are in the request information.

In a possible design, the request information is further for determination of the second policy information, and the second policy information is for processing of a session. Therefore, based on different continuity requirements of the APP in the request information, the policy control function network element may provide, for the session management function network element, the second policy information, and the session management function network element processes the session based on the second policy information, so that a session path may be shortened, and transmission efficiency is improved.

According to another aspect, this application further discloses a session processing method. The method includes: receiving, by a policy control function network element (for example, a PCF network element), request information from an application function network element (for example, an AF network element), where the request information includes a continuity requirement of an APP, and the request information is for determination of session policy information; and sending, by the policy control function network element, the session policy information to a session management function network element (for example, an SMF network element), where the session policy information is for processing of a session.

According to the foregoing method, based on different continuity requirements of the APP in the request information, the policy control function network element may provide, for the session management function network element, the session policy information, and the session management function network element processes the session based on the session policy information on a premise that the session meets the continuity requirement of the APP, so that a session path may be shortened, and transmission efficiency is improved.

In a possible design, the policy control function network element determines the session policy information based on the request information, and the continuity requirement includes that the APP does not need continuity, the APP needs IP address continuity, or the APP supports upper-layer service continuity. Therefore, based on different continuity requirements of the APP in the request information, the policy control function network element may provide, for the session management function network element, the session policy information related to the continuity requirement of the APP.

In a possible design, if the continuity requirement is that the APP does not need continuity, the policy control function network element determines that the session policy information is a multi-homing offload policy or a ULCL offload policy. Therefore, based on the requirement, in the request information, that the APP does not need continuity, the policy control function network element may provide the session policy information for the session management function network element, and perform multi-homing offload or ULCL offload processing on a session on a premise that the session meets the requirement that the APP does not need continuity, so that a session path may be shortened, and transmission efficiency is improved.

In a possible design, if the continuity requirement is that the APP supports upper-layer service continuity, the policy control function network element determines that the session policy information is a multi-homing offload policy. Therefore, based on the requirement, in the request information, that the APP supports upper-layer service continuity, the policy control function network element may provide the session policy information for the session management function network element, and perform multi-homing offload processing on a session on a premise that the session meets the requirement that the APP supports upper-layer service continuity, so that a session path may be shortened, and transmission efficiency is improved.

In a possible design, when the continuity requirement is that the APP needs IP address continuity, the request information further includes indication information for indicating whether a server of the APP supports context migration with another APP server. Therefore, the policy control function network element may provide the session policy information for the session management function network element based on the requirement that the APP needs IP address continuity and the indication information indicating whether the APP server supports context migration with another APP server that are in the request information.

In a possible design, if the indication information indicates that the APP server supports context migration with the another APP server, the policy control function network element determines that the session policy information is a ULCL offload policy. Therefore, based on the requirement that the APP needs IP address continuity and the indication information indicating that the APP server supports context migration with the another APP server that are in the request information, the policy control function network element may provide the session policy information for the session management function network element, and performs ULCL offload processing on a session on a premise that the session meets the requirement that the APP needs IP address continuity, so that a session path may be shortened, and transmission efficiency is improved.

In a possible design, if the indication information indicates that the APP server does not support context migration with the another APP server, the policy control function network element determines that the session policy information is to keep an anchor user plane function network element for accessing the APP server unchanged. Therefore, based on the requirement that the APP needs IP address continuity and the indication information indicating that the APP server does not support context migration with the another APP server that are in the request information, the policy control function network element may provide the session policy information for the session management function network element, and keeps the anchor user plane function network element that accesses the APP server and that is in a session unchanged on a premise that the session meets the requirement that the APP needs IP address continuity, so that a session path may be shortened, and transmission efficiency is improved.

According to another aspect, this application further discloses a session processing method. The method includes: determining, by an application function network element (for example, an AF network element), a continuity requirement of an APP; and sending, by the application function network element, request information to a policy control function network element (for example, a PCF network element), where the request information includes the continuity requirement, the request information is for determination of session policy information, and the session policy information is for processing of a session.

According to the foregoing method, the application function network element may provide the continuity requirement of the APP for the policy control function network element, so that the session policy information sent by the policy control function network element to a session management function network element is related to the continuity requirement of the APP. The session management function network element processes the session based on the session policy information on a premise that the session meets the continuity requirement of the APP, so that a session path may be shortened, and transmission efficiency is improved.

In a possible design, the continuity requirement includes that the APP does not need continuity, the APP needs IP address continuity, or the APP supports upper-layer service continuity. Therefore, based on different continuity requirements of the APP in the request information, the policy control function network element may provide, for the session management function network element, the session policy information related to the continuity requirement of the APP.

In a possible design, when the continuity requirement is that the APP needs IP address continuity, the request information further includes indication information for indicating whether a server of the APP supports context migration with another APP server. Therefore, the policy control function network element may provide the session policy information for the session management function network element based on the requirement that the APP needs IP address continuity and the indication information indicating whether the APP server supports context migration with another APP server that are in the request information.

According to another aspect, an embodiment of this application provides a session processing apparatus. The session processing apparatus has a function of implementing behavior of the policy control function network element (for example, the PCF network element) in the foregoing methods. The function may be implemented by hardware, or may be implemented by hardware executing corresponding software. The hardware or the software includes one or more modules corresponding to the foregoing function. In a possible design, a structure of the session processing apparatus includes a processor and a transceiver. The processor is configured to perform, for the session processing apparatus, a corresponding function in the foregoing methods. The transceiver is configured to implement communication between the session processing apparatus and an application function network element/a session management function network element. The session processing apparatus may further include a memory. The memory is coupled to the processor, and the memory stores a program instruction and data that are necessary for the session processing apparatus.

According to another aspect, an embodiment of this application provides a session processing apparatus. The session processing apparatus has a function of implementing behavior of the application function network element (for example, the AF network element) in the foregoing methods. The function may be implemented by hardware, or may be implemented by hardware executing corresponding software. The hardware or the software includes one or more modules corresponding to the foregoing function. In a possible design, a structure of the session processing apparatus includes a processor and a transceiver. The processor is configured to perform, for the session processing apparatus, a corresponding function in the foregoing methods. The transceiver is configured to implement communication between the session processing apparatus and a policy control function network element. The session processing apparatus may further include a memory. The memory is coupled to the processor, and the memory stores a program instruction and data that are necessary for the session processing apparatus.

According to another aspect, an embodiment of this application provides a computer-readable storage medium. The computer-readable storage medium stores an instruction, and when the instruction is run on a computer, the computer is enabled to perform the methods in the foregoing aspects.

According to another aspect, an embodiment of this application provides a computer program product including an instruction. When the computer program product is run on a computer, the computer is enabled to perform the methods in the foregoing aspects.

According to another aspect, this application provides a chip system. The chip system includes a processor, configured to support the session processing apparatus in implementing a function in the foregoing aspects, for example, generating or processing the information in the foregoing methods. In a possible design, the chip system further includes a memory, and the memory is configured to save necessary program instructions and data of a data sending device. The chip system may include a chip, or may include a chip and another discrete component.

BRIEF DESCRIPTION OF DRAWINGS

To describe technical solutions in embodiments of the present invention or in the background more clearly, the following describes the accompanying drawings required for describing the embodiments of the present invention or the background.

DESCRIPTION OF EMBODIMENTS

The following clearly describes technical solutions in embodiments of this application with reference to the accompanying drawings in the embodiments of this application.

"A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
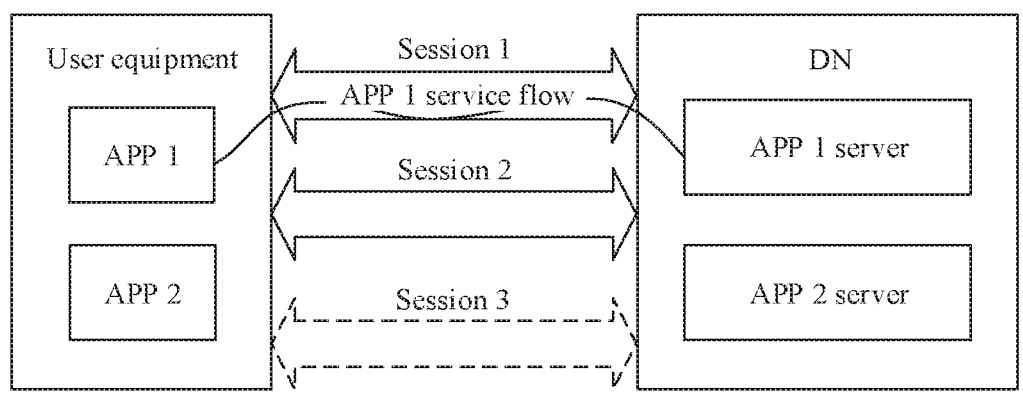
FIG. 1 is a schematic diagram of a scenario in which user equipment performs session processing according to the prior art of this application.
Figure 2:
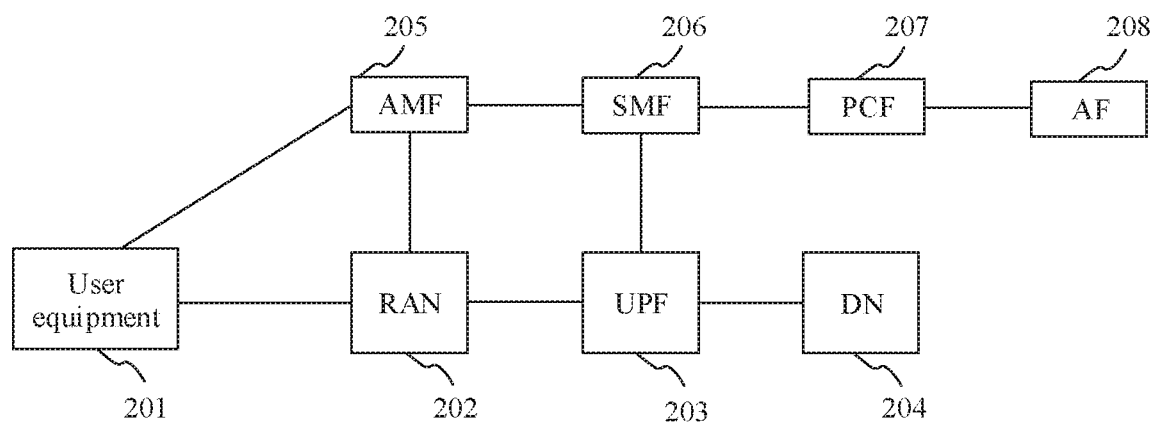
FIG. 2 is a schematic diagram of a 5G communications system according to an embodiment of this application.

FIG. 2 is a schematic diagram of a 5G communications system according to an embodiment of this application. In a 5G mobile network architecture, a control plane function of a mobile gateway is decoupled from a forwarding plane function, and the separated control plane function, a conventional 3rd generation partnership project (third generation partnership project, 3GPP) control network element mobility management entity (mobility management entity, MME), and the like are combined into a unified control plane (control plane). A user plane function (User plane function, UPF) network element can implement user plane functions (SGW-U and PGW-U) of a serving gateway (serving gateway, SGW) and a packet data network gateway (packet data network gateway, PGW). Further, the unified control plane network element may be decomposed into an access and mobility management function (access and mobility management function, AMF) network element and a session management function (session management function, SMF) network element.

As shown in FIG. 2, the communications system includes at least user equipment 201, an SMF network element 206, a PCF network element 207, and an AF network element 208.

The user equipment 201 in this system is not limited to a 5G network, and includes a mobile phone, an internet of things device, a smart home device, an industrial control device, a vehicle device, and the like. The user equipment (User Device or User Equipment) may alternatively be referred to as a terminal device (Terminal Equipment), a mobile station (Mobile Station), a mobile console (Mobile), a remote station (Remote Station), a remote terminal (Remote Terminal), an access terminal (Access Terminal), a user device (User Terminal), or a user agent (User Agent). This is not limited herein. The user equipment may alternatively be a vehicle in vehicle-to-vehicle (Vehicle-to-vehicle, V2V) communication, a machine in machine type communication, or the like.

The SMF network element 206 in this system may be responsible for session management of the terminal device. For example, the session management includes user plane device selection, user plane device reselection, internet protocol address allocation, quality of service (quality of service, QoS) control, and session establishment, modification, or release. The SMF network element may also be referred to as an SMF device or an SMF entity.

The policy control function (policy control function, PCF) network element 207 includes a policy control function and a flow-based charging control function. For example, the PCF network element 207 may implement a user subscription data management function, a policy control function, a charging policy control function, and QoS control. The PCF network element may also be referred to as a PCF entity or a PCF device.

The AF network element 208 interacts with a 3GPP network, and can provide a requirement that a session established between the user equipment and an APP server needs to meet, for example, can support influence on traffic routing. The AF network element 208 may further perform policy control by interacting with the PCF. The AF network element may also be referred to as an AF device or an AF entity.

Optionally, the communications system further includes a radio access network (Radio Access Network, RAN) device 202. The RAN device 202 is an apparatus configured to provide a wireless communication function for the user equipment 201. The RAN device may include base stations of various forms, for example, a macro base station, a micro base station (also referred to as a small cell), a relay station, and an access point. In systems that use different radio access technologies, names of a device that has a base station function may be different. For example, in an LTE system, the device is referred to as an evolved NodeB (evolved NodeB, eNB or eNodeB). In a 3rd generation (3rd Generation, 3G) system, the device is referred to as a NodeB (Node B). In a new generation system, the device is referred to as a gNB (gNodeB).

Optionally, the communications system further includes a UPF network element 203. The UPF network element 203 can implement user plane functions (the SGW-U and the PGW-U) of the SGW and the PGW. The UPF network element may be connected to a same data network 204 (data network, DN) or different data networks 204, to implement data transmission of a service. The UPF network element may also be referred to as a UPF device or a UPF entity.

Optionally, the communications system further includes an AMF network element 205. The AMF network element may be responsible for attachment, mobility management, a tracking area update procedure, and the like of the terminal device. The AMF network element may also be referred to as an AMF device or an AMF entity.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, this embodiment of this application may also be applicable to another future-oriented communications technology. The network architecture and the service scenario described in this application are intended to describe the technical solutions of this application more clearly, and do not constitute a limitation on the technical solutions provided in this application. A person of ordinary skill in the art may know that: With evolution of the network architecture and emergence of new service scenarios, the technical solutions provided in this application are also applicable to similar technical problems.

The following uses the 5G communications system shown in FIG. 2 as an example, to describe in detail the technical solutions of this application by using some embodiments. The following several embodiments may be combined with each other, and a same or similar concept or process may not be described repeatedly in some embodiments.

Figure 3:
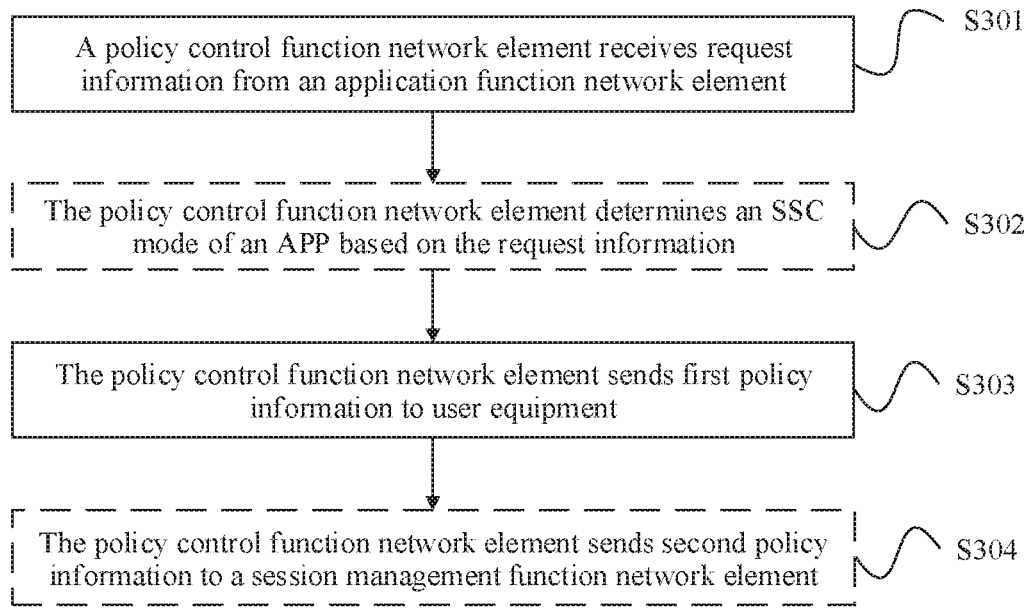
FIG. 3 is a flowchart of a session processing method according to an embodiment of this application.

FIG. 3 is a flowchart of a session processing method according to an embodiment of this application. The method may be used in a scenario in which user equipment performs session processing based on a continuity requirement of an APP. As shown in FIG. 3, the method may include the following steps.

S301: A policy control function network element receives request information from an application function network element. The request information includes a continuity requirement of an APP.

For example, the policy control function network element is the PCF network element 207 in FIG. 2, and the application function network element is the AF network element 208 in FIG. 2.

The request information is for indicating the continuity requirement that a session established between the user equipment and a server of the APP needs to meet after the user equipment starts the APP. For example, the continuity requirement of the APP may also be referred to as a continuity requirement of the APP server.

S303: The policy control function network element sends first policy information to the user equipment. The first policy information includes an SSC mode of the APP the first policy information is associated with the continuity requirement of the APP, and the first policy information is for determining whether to reuse or newly establish a session. For example, the first policy information may be user equipment policy (User Equipment Policy, UE Policy) information or user equipment route selection policy (User Equipment Route Selection Policy, URSP) information.

For example, the user equipment is the user equipment 201 in FIG. 2. The user equipment may determine, based on the first policy information in the following manner, whether to reuse or newly establish a session: After receiving, from the policy control function network element, the first policy information associated with the continuity requirement of the APP, if the user equipment finds that a session that meets the SSC mode in the first policy information exists in existing sessions, the user equipment determines to reuse the session when starting the APP; or if the user equipment finds that no session that meets the SSC mode in the first policy information exists in the existing sessions, the user equipment determines to newly establish a session when starting the APP. If the user equipment determines to reuse the session, when only one session in the existing sessions meets the SSC mode, the user equipment communicates with the APP server by reusing the session. When a plurality of sessions in the existing sessions meet the SSC mode, the user equipment may randomly select a session from the plurality of sessions to communicate with the APP server. It should be noted that the present invention uses only the SSC mode as an example for description. During actual application, in addition to the SSC mode, conditions for determining whether to reuse a session may further include at least one of a DNN and slice information. In other words, if a session that meets the SSC mode, the DNN, or the slice information in the first policy information exists in the existing sessions, the user equipment determines to reuse the session when starting the APP.

Therefore, according to the method in this embodiment of the present invention, the user equipment may obtain the first policy information related to the continuity requirement of the APP. The user equipment performs session processing based on the first policy information when starting the APP: If a session that meets the SSC mode in the first policy information exists in the existing sessions of the user equipment, the user equipment reuses the session; or if no session that meets the SSC mode in the first policy information exists in the existing sessions of the user equipment, the user equipment directly initiates a session establishment procedure. Because the first policy information is related to the continuity requirement of the APP, the session reused or newly established by the user equipment based on the first policy information meets the continuity requirement for communication between the user equipment and the server of the APP, and therefore, user experience is improved.

Optionally, before step 303, the policy control function network element may perform the following S302.

S302: The policy control function network element determines the SSC mode of the APP based on the request information. The continuity requirement of the APP in the request information includes that the APP does not need continuity, the APP needs IP address continuity, or the APP supports upper-layer service continuity.

For example, that the APP does not need continuity indicates that service continuity does not need to be maintained when the user equipment communicates with the server of the APP. For example, the user equipment uses an APP having a search function to initiate a web page query service to the APP server of the APP. After the user equipment moves, a session path from the user equipment to the APP server becomes longer. Because the APP does not need continuity, a session corresponding to the APP may be released, and a session is newly established when the user equipment re-initiates a web page query service.

That the APP needs IP address continuity indicates that it needs to ensure that an IP address of the APP remains unchanged when the user equipment communicates with the server of the APP. For example, when the user equipment uses an APP having a voice communication function to initiate a voice service to the APP server of the APP, after the user equipment moves, because the APP needs IP address continuity, an original session needs to be maintained, and an IP address used by the user equipment to access the APP server also needs to remain unchanged.

That the APP supports upper-layer service continuity indicates that when the user equipment communicates with the server of the APP, it needs to ensure that a service of the APP is not interrupted, and an IP address of the user equipment may be changed. For example, when the user equipment uses an APP having a video function to initiate a video service to the APP server of the APP, it needs to ensure that a user is not aware of interruption of the video service, and an IP address of the user equipment may be changed.

For example, the SSC mode of the APP includes three types: a first mode, a second mode, and a third mode. The policy control function network element may determine the SSC mode of the APP in any one of the following manners based on the request information.

Manner 1: When the continuity requirement of the APP in the request information is that the APP does not need continuity, the policy control function network element determines that the SSC mode of the APP is the second mode. In the second mode, a network may release a connection service provided for the user equipment and release a corresponding packet data unit (Packet Data Unit, PDU) session. For a PDU session of an internet protocol version (Internet Protocol Version, IPv) 4 or IPv6 type that is used when the user equipment communicates with the APP server, the network may release an IP address that has been allocated to the user equipment. In other words, in the second mode, a service connection between the APP server and the user equipment is allowed to be disconnected. In the second mode, the network may not only release the connection service connection between the user equipment and the APP server, but also release the IP address of the user equipment. Therefore, the second mode meets the requirement that the APP does not need continuity.

Manner 2: When the continuity requirement of the APP in the request information is that the APP supports upper-layer service continuity, the policy control function network element determines that the SSC mode of the APP is the third mode. In the third mode, the network reserves a connection service provided for the user equipment. For a PDU session of an IPv4 or IPv6 type that is used when the user equipment communicates with the APP server, the network may not reserve an IP address of the user equipment. In other words, in the third mode, a service connection between the APP server and the user equipment is reserved, and an IP address of the APP is allowed to change. In the third mode, the network may maintain service continuity, and may not reserve the IP address of the user equipment. Therefore, the third mode meets the requirement that the APP supports upper-layer service continuity.

Manner 3: When the continuity requirement of the APP in the request information is that the APP needs IP address continuity, the policy control function network element determines that the SSC mode of the APP is the first mode. In the first mode, the network reserves a connection service provided for the user equipment. For a PDU session of an IPv4 or IPv6 type that is used when the user equipment communicates with the APP server, the network further reserves an IP address of the user equipment. In other words, in the first mode, a session connection between the APP server and the user equipment is reserved, and an IP address of the APP remains unchanged. In the first mode, the network maintains continuity of the service and continuity of the IP address of the user equipment. Therefore, the first mode meets the requirement that the APP needs IP address continuity.

Therefore, according to the foregoing solution, the policy control function network element may determine, based on the request information, SSC modes of the APP that are corresponding to different continuity requirements of the APP, and then send the SSC modes of the APP to the user equipment by using the first policy information. When communicating with the server of the APP, the user equipment performs session processing based on the SSC mode in the first policy information, so that the reused or newly established session meets the continuity requirement of the APP, and therefore, user experience is improved.

Optionally, after step 301, the policy control function network element may perform the following S304. It should be noted that a sequence of step S303 and step S304 is not limited in this application. In other words, step S303 may be performed before step S304, or step S304 may be performed before step S303, or step S303 and step S304 are performed simultaneously.

S304: The policy control function network element sends second policy information to a session management function network element.

For example, the session management function network element is the SMF network element 206 in FIG. 2. The second policy information may be transmitted in a form of a policy control and charging (Policy Control and Charging, PCC) rule.

The second policy information is related to the continuity requirement of the APP in the request information. For example, the policy control function network element may determine the second policy information in any one of the following manners.

Manner 1: When the continuity requirement of the APP in the request information is that the APP does not need continuity, the second policy information is a multi-homing (multi-homing) offload policy, an uplink classifier (Uplink Classifier, ULCL) offload policy, or a multi-session (multi-PDU sessions) policy.

ULCL Offload Policy:

For example, the ULCL offload policy is executed by an SMF network element. During or after PDU session establishment, the SMF network element inserts a UPF network element having a ULCL function into a PDU session transmission path, to implement offload. For a PDU session of an IPv4 or IPv6 type that is used when user equipment communicates with an APP server, after ULCL offload is performed, only one IP address is allocated to the user equipment, and therefore, the user equipment is not aware of the offload. After ULCL offload is performed on the session, the unique IP address allocated to the user equipment may be an IP address of the user equipment before the offload, and the session is not interrupted in the offload process. Therefore, performing ULCL offload on the session by the SMF network element can ensure continuity of a service and continuity of the IP address of the user equipment.

Figure 4:
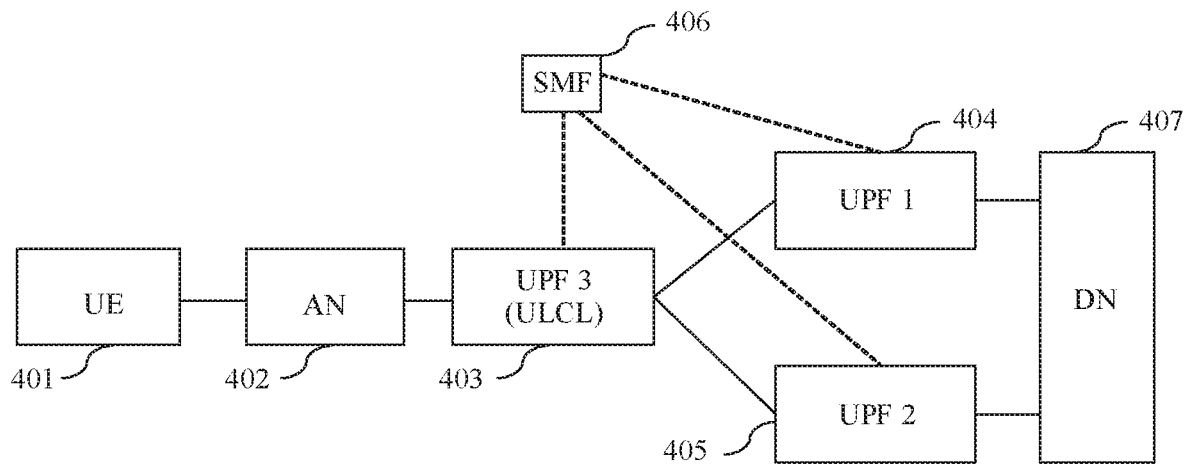
FIG. 4 is a schematic diagram of a ULCL offload policy implementation method according to an embodiment of this application.

For example, a ULCL offload policy implementation method is shown in FIG. 4. In FIG. 4, a UPF 1 network element 404 and a UPF 2 network element 405 may provide different paths to access a DN 407. It is assumed that UE 401 includes an APP 1 and an APP 2. An APP 1 server and an APP 2 server are in the DN 407. When the UE 401 starts the APP 1 and offload does not need to be performed, an IP address of the UE 401 is an IP 1 address, the UE 401 requests, by using the IP 1 address, to establish a session, and then establishes the session between the UE 401 and the APP 1 server by using an access network (Access Network, AN) device 402 and the UPF 1 network element 404, to implement access of the UE 401 to the DN 407. When the UE 401 starts the APP 2 and the APP 2 server is a local server, in other words, a deployment position of the APP 2 server is closer to the UE 401 than a position of the APP 1 server is, ULCL offload may be performed, an SMF network element 406 inserts a UPF 3 network element 403 having a ULCL function into a session transmission path, and the IP address of the UE 401 is still the IP 1 address. The UE 401 initiates a service flow by using the IP 1 address, and then is connected to the UPF 3 network element 403 by using the AN device 402. The UPF 3 network element 403 forwards a service flow of the APP 1 by using the UPF 1 network element 404, and forwards a service flow of the APP 2 by using the UPF 2 network element 405. In addition, a service flow from the APP 1 server and a service flow from the APP 2 server are aggregated to the UPF 3 network element 403 by respectively using the UPF 1 network element 404 and the UPF 2 network element 405, and then are forwarded to the UE 401 by using the AN device 402. In this case, the UE 401 accesses the DN 407 by using a new path, to implement offload.

Therefore, in the foregoing solution, performing ULCL offload on the session by the SMF network element can ensure continuity of the service and continuity of the IP address of the user equipment. Therefore, when the continuity requirement of the APP in the request information is that the APP does not need continuity, the requirement may also be met by using the ULCL offload. In addition, assuming that, in FIG. 4, a distance from the UPF 2 network element 405 to the UE 401 is less than a distance from the UPF 1 network element 404 to the UE 401, ULCL offload may be used to shorten a session transmission path from the user equipment to the DN, and therefore, transmission efficiency is improved.

Multi-Homing Offload Policy:

For example, the multi-homing offload policy is implemented by inserting, by an SMF network element, a UPF network element having a branching point (Branching Point, BP) function into a PDU session transmission path. After multi-homing offload is performed on a PDU session, user equipment may be connected to different PDU session anchors of a same DN by using the UPF network element having the branching point function, and access the DN by using the different PDU session anchors. In the foregoing process, the user equipment may determine different session transmission paths to the DN. After the SMF network element performs multi-homing offload on the session, different PDU session anchors correspond to different transmission paths, and each of different IP addresses is allocated to the user equipment for each transmission path, in other words, an IP address of the user equipment changes after multi-homing offload. In addition, because a service is not interrupted in the offload process, performing multi-homing offload on the session by the SMF network element can ensure upper-layer service continuity. In the upper-layer service continuity implementation method, service flow migration may be implemented by using technologies such as MPTCP (Multipath TCP, multipath TCP), and SIP (Session Initiation Protocol, Session Initiation Protocol).

Figure 5:
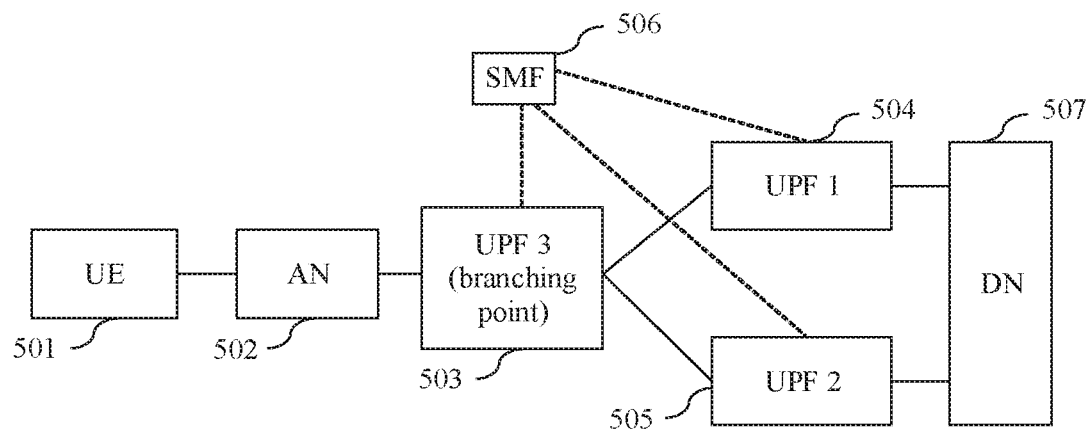
FIG. 5 is a schematic diagram of a multi-homing offload policy implementation method according to an embodiment of this application.

For example, a multi-homing offload policy implementation method is shown in FIG. 5. In FIG. 5, a UPF 1 network element 504 and a UPF 2 network element 505 may provide different paths to access a DN 507. It is assumed that UE 501 includes an APP 1, and an APP 1 server is in the DN 507. When the UE 501 starts the APP 1 and offload does not need to be performed, an IP address of the UE 501 is an IP 1 address, the UE 501 requests, by using the IP 1 address, to establish a session, and then the UE 501 may establish the session between the UE 501 and the APP 1 server by using an AN device 502 and the UPF 1 network element 504, to implement access of the UE 501 to the DN 507. When the UE 501 moves and multi-homing offload needs to be performed, an SMF network element 506 inserts a UPF 3 network element 503 having a branching point function into a session transmission path, and allocates a new IP address prefix to the UE 501. The UE 501 constructs a new IP address IP 2 based on the new IP address prefix. A session path established by the UE 501 by using the IP 1 address is a session path corresponding to the PDU session anchor UPF 1 network element 504, and a session path established by the UE 501 by using the IP 2 address is a session path corresponding to the PDU session anchor UPF 2 network element 505. The UPF 3 network element 503 forwards service flows of the APP 1 by using the UPF 1 network element 504 and the UPF 2 network element 505. In addition, service flows from the APP 1 server are aggregated to the UPF 3 network element 503 by separately using the UPF 1 network element 504 and the UPF 2 network element 505, and then are forwarded to the UE 501 by using the AN device 502. In this case, the UE 501 accesses the DN 507 by using a new path, to implement offload.

Therefore, in the foregoing solution, performing multi-homing offload on the session by the SMF network element can ensure upper-layer service continuity. Therefore, when the continuity requirement of the APP in the request information is that the APP does not need continuity, the requirement may also be met by using the multi-homing offload. In addition, assuming that, in FIG. 5, a distance from the UPF 2 network element 505 to the UE 501 is less than a distance from the UPF 1 network element 504 to the UE 501, multi-homing offload may be used to shorten a session transmission path from the user equipment to the DN, and therefore, transmission efficiency is improved.

Multi-Session Policy:

For example, the multi-session policy is implemented by newly establishing a session. After performing multi-session processing on a PDU session, user equipment may be connected to a same DN by using different PDU session anchors, to determine different session transmission paths to the DN. A service flow of an existing service before the multi-session processing may be transmitted on an existing path before the multi-session processing, or may be transmitted on a path newly added after the multi-session processing. A service flow of a newly-established service after the multi-session processing is transmitted on a path newly added after the multi-session processing. When the service flow of the existing service before the multi-session processing is transmitted on the path newly added after the multi-session processing, service flow migration is implemented by using technologies such as MPTCP and SIP. After an SMF network element performs multi-session processing on the session, different PDU session anchors may correspond to different transmission paths, and each of different IP addresses is allocated to the user equipment for each transmission path, in other words, an IP address of the user equipment changes after the multi-session policy processing. In addition, because a service is not interrupted in the offload process, performing multi-session policy processing on the session by the SMF network element can ensure upper-layer service continuity.

Figure 6:
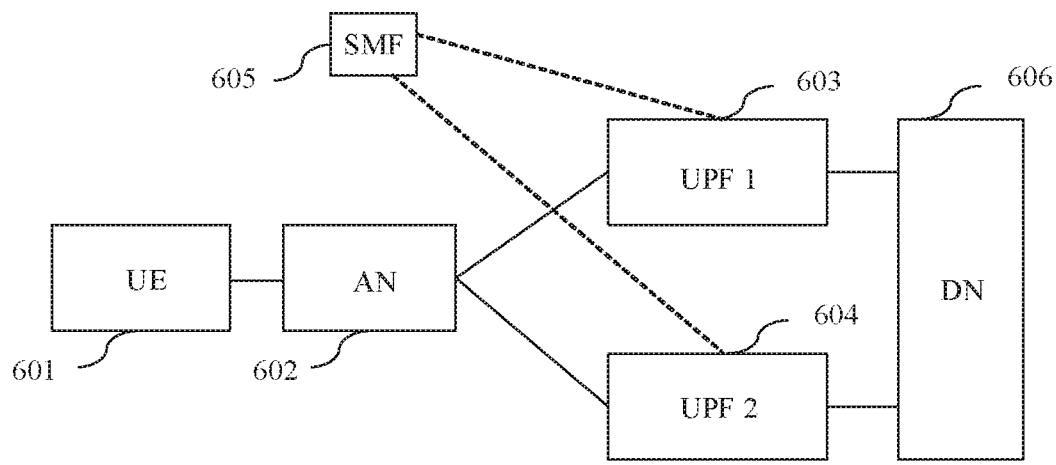
FIG. 6 is a schematic diagram of a multi-session policy implementation method according to an embodiment of this application.

FIG. 6 shows a multi-session policy implementation method. In FIG. 6, a UPF 1 network element 603 and a UPF 2 network element 604 may provide different paths to access a DN 606. It is assumed that UE 601 includes an APP 1, and an APP 1 server is in the DN 606. When the UE 601 starts the APP 1 and offload does not need to be performed, an IP address of the UE 601 is an IP 1 address, the UE 601 requests, by using the IP 1 address, to establish a session, and then the UE 601 may establish the session between the UE 601 and the APP 1 server by using an AN device 602 and the UPF 1 network element 603, to implement access of the UE 601 to the DN 606. When the UE 601 moves and multi-session processing needs to be performed, an SMF network element newly establishes a session for the UE 601, and allocates a new IP address IP 2 to the UE 601. The session established by the UE 601 by using the IP 1 address is a session between the UE 601 and the APP 1 server that is established by connecting the AN device 602 to the PDU session anchor UPF 1 network element 603. The session established by the UE 601 by using the IP 2 address is a session between the UE 601 and the APP 1 server that is established by connecting the AN device 602 to the PDU session anchor UPF 2 network element 604. In this case, the UE 601 accesses the DN 606 by using a new path. Different from multi-homing offload, a service flow transmitted by the UE 601 to the DN 606 by using the UPF 1 network element 603 and a service flow transmitted by the UE 601 to the DN 606 by using the UPF 2 network element 604 are separately transmitted by using two transmission paths, and there is no aggregation point having a function similar to the branching point function. A service flow from the DN 606 is also forwarded to the UE 601 by using a transmission path including the UPF 1 network element 603 or a transmission path including the UPF 2 network element 604.

Therefore, in the foregoing solution, performing multi-session policy processing on the session by the SMF network element can ensure upper-layer service continuity. Therefore, when the continuity requirement of the APP in the request information is that the APP does not need continuity, the requirement may also be met by using multi-session policy processing. In addition, assuming that, in FIG. 6, a distance from the UPF 2 network element 604 to the UE 601 is less than a distance from the UPF 1 network element 603 to the UE 601, multi-session policy processing may be used to shorten a session transmission path from the user equipment to the DN, and therefore, transmission efficiency is improved.

Manner 2: When the continuity requirement of the APP in the request information is that the APP supports upper-layer service continuity, the second policy information is a multi-homing offload policy or a multi-session policy.

Referring to the multi-homing offload policy implementation method in FIG. 5 and the multi-session policy implementation method in FIG. 6, performing multi-homing offload policy or multi-session policy processing on the session by the SMF network element can ensure upper-layer service continuity. Therefore, when the continuity requirement of the APP in the request information is that the APP supports upper-layer service continuity, the requirement may be met by using multi-homing offload policy or multi-session policy. In addition, assuming that, in FIG. 5, a distance from the UPF 2 network element 505 to the UE 501 is less than a distance from the UPF 1 network element 504 to the UE 501, and in FIG. 6, a distance from the UPF 2 network element 604 to the UE 601 is less than a distance from the UPF 1 network element 603 to the UE 601, multi-homing offload policy or multi-session policy may be used to shorten a session transmission path from the user equipment to the DN, and therefore, transmission efficiency is improved.

Optionally, the request information further includes indication information for indicating whether a server of the APP supports context migration with another APP server.

Manner 3: When the continuity requirement of the APP in the request information is that the APP needs IP address continuity and the indication information in the request information indicates that the APP server supports context migration with the another APP server, the second policy information is a ULCL offload policy.

Referring to the ULCL offload policy implementation method in FIG. 4, performing ULCL offload on the session by the SMF network element can ensure continuity of the service and continuity of the IP address of the user equipment. Therefore, when the continuity requirement of the APP in the request information is that the APP needs IP address continuity and the indication information in the request information indicates that the APP server supports context migration with the another APP server, the requirement may be met by using the ULCL offload policy. In addition, assuming that, in FIG. 4, a distance from the UPF 2 network element 405 to the UE 401 is less than a distance from the UPF 1 network element 404 to the UE 401, ULCL offload may be used to shorten a session transmission path from the user equipment to the DN, and therefore, transmission efficiency is improved.

Optionally, when the continuity requirement of the APP in the request information is that the APP needs IP address continuity and the indication information in the request information indicates that the APP server supports context migration with the another APP server, the second policy information may alternatively be a processing policy, and the processing policy is to establish an end-to-end tunnel between the user equipment and the APP server.

For example, two APP servers distributed in different areas each may provide a service for the user equipment when the user equipment uses an APP. The two APP servers are respectively a first APP server and a second APP server, and a distance from the second APP server to the user equipment is less than a distance from the first APP server to the user equipment. It is assumed that the user equipment first establishes a session with the first APP server and performs service flow transmission. When the request information indicates that the continuity requirement is that the APP needs IP address continuity and the first APP server supports context migration with the second APP server, an SMF may establish an end-to-end tunnel between the user equipment and the second APP server based on the foregoing processing policy, on a premise that IP address continuity is ensured, so that a session transmission path is shortened and transmission efficiency is improved.

Figure 7:
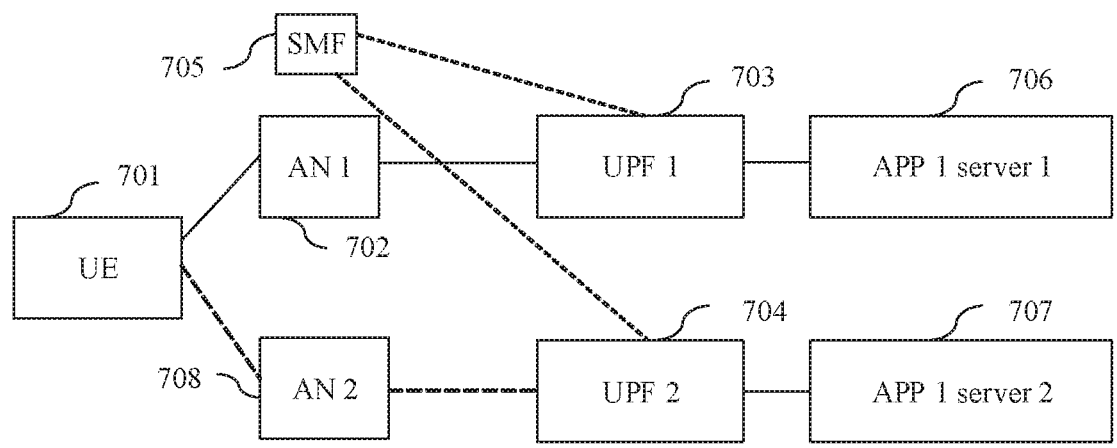
FIG. 7 is a schematic diagram of a processing policy implementation method according to an embodiment of this application.

For example, a processing policy implementation method is shown in FIG. 7. In FIG. 7, it is assumed that UE 701 includes an APP 1, and an APP 1 server 1 (706) and an APP 1 server 2 (707) that are distributed in different areas may each provide a service for the user equipment when the user equipment uses the APP 1. The APP 1 server 1 (706) supports context migration with the APP 1 server 2 (707), and a distance from the APP 1 server 2 (707) to the user equipment is less than a distance from the APP 1 server 1 (706) to the user equipment. Before an SMF network element 705 executes the processing policy, an IP address of the UE 701 is an IP 1 address, the UE 701 requests, by using the IP 1 address, to establish a session, and then, the UE 701 may establish the session between the UE 701 and the APP 1 server 1 (706) by using an AN device 702 and a UPF 1 network element 703. After the SMF network element 705 executes the processing policy, the UE 701 establishes a session by using an end-to-end tunnel between the UE 701 and the APP 1 server 2 (707), but still uses the IP 1 address. For example, in a session path in which the UE 701 accesses the APP 1 server 2 (707) by using a UPF 2 network element 704, the UPF 2 network element encapsulates, based on a tunneling protocol, a service flow packet that carries the IP address IP 1 of the UE into a tunneling header, and forwards the tunneling header to the APP 1 server 2 (707). Therefore, a service flow of the UE 701 can be forwarded to the APP 1 server 2 (707). For example, the tunneling protocol may be a combination of an IP in IP tunneling protocol and a general packet radio system (General Packet Radio System. GPRS) tunneling protocol, or an IP in IP tunneling protocol and/or another tunneling protocol, or a GPRS tunneling protocol and/or another tunneling protocol. In addition, because the APP 1 server 1 (706) may migrate a context to the APP 1 server 2 (707), when the UE 701 accesses the APP 1 server 2 (707) by using the AN device 708 and the UPF 2 network element 704, context continuity may be ensured, in other words, service continuity is ensured.

Therefore, in the foregoing solution, after the SMF network element executes the processing policy on the session, continuity of the service and continuity of the IP address of the user equipment may be ensured. Therefore, when the continuity requirement of the APP in the request information is that the APP needs IP address continuity and the indication information in the request information indicates that the APP server supports context migration with the another APP server, the requirement may be met by using the processing policy. In addition, after the processing policy is executed, a session path is shortened, and therefore, transmission efficiency may be improved.

Manner 4: When the continuity requirement of the APP in the request information is that the APP needs IP address continuity and the indication information in the request information indicates that the APP server does not support context migration with the another APP server, the second policy information is to keep an anchor user plane function network element for accessing the APP server unchanged.

Figure 8:
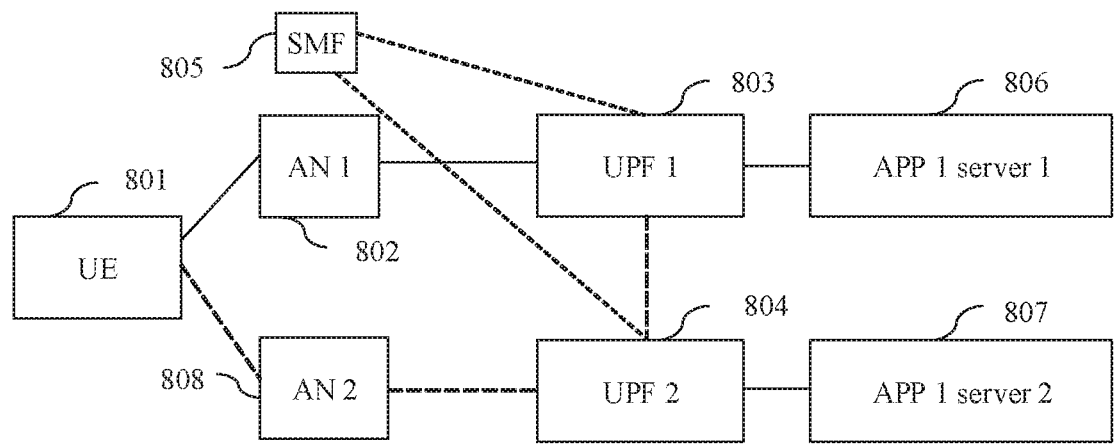
FIG. 8 is a schematic diagram of a policy implementation method for keeping an anchor user plane function network element for accessing an APP server unchanged according to an embodiment of this application.

As shown in FIG. 8, it is assumed that UE 801 includes an APP 1, and two servers APP 1 server 1 (806) and APP 1 server 2 (807) corresponding to the APP 1 are deployed at different positions in a same DN, and context migration is not supported between the APP 1 server 1 and the APP 1 server 2. At the beginning, the UE 801 is relatively close to the APP 1 server 1. The UE 801 requests, by using an IP 1 address, to establish a session, and then establishes the session between the UE 801 and the APP 1 server 1 (806) by using an AN 1 device 802 and a UPF 1 network element 803, to implement access of the UE 801 to the DN. After the UE 801 moves, a distance from the UE 801 to the APP 1 server 2 (807) is less than a distance from the UE 801 to the APP 1 server 1 (806). However, because context migration is not supported between the APP 1 server 1 (806) and the APP 1 server 2 (807), to ensure IP address continuity of the APP, the UE 801 cannot establish a session between the UE 801 and the APP 1 server 2 (807) by using a UPF 2 network element 804. However, the session between the UE 801 and the APP 1 server 1 that is established by using the UPF 1 network element 803 needs to be maintained, in other words, an anchor user plane function network element (for example, the UPF 1 network element 804) accessing the APP server is kept unchanged. For example, in a session path that is from the UE 801 to the APP 1 server 1 (806) and that is established by the UE 801 by using an AN 2 device 808 and the UPF 1 network element 803, the AN 2 device 808 may alternatively be connected to the UPF 1 network element 803 by using another UPF device (for example, the UPF 2 network element 804). However, the anchor user plane function network element of the APP 1 server 1 is still the UPF 1 network element 803.

Therefore, when the continuity requirement of the APP in the request information is that the APP needs IP address continuity and the indication information in the request information indicates that the APP server does not support context migration with the another APP server, the requirement of IP address continuity can be met by using the policy of keeping the anchor user plane function network element for accessing the APP server unchanged.

Step S304 is an optional step. The second policy information sent by the policy control function network element to the session management function network element may alternatively be another policy. This is not limited in the present invention.

Therefore, in the foregoing solutions, after the user equipment determines, based on the first policy information, whether to reuse or newly establish a session, the session management function network element processes the reused or newly established session based on the second policy information. Because the second policy information is related to the continuity requirement of the APP in the request information, the session processed by the second policy information still meets the continuity requirement of the APP, and therefore, user experience is improved. In addition, in a process of processing the session based on the second policy information, the network uses a new UPF network element, so that a transmission path from the user equipment to the APP server is shorter, and therefore, a service flow transmission time when the user equipment communicates with the APP server is saved, and transmission efficiency is improved.

Figure 9:
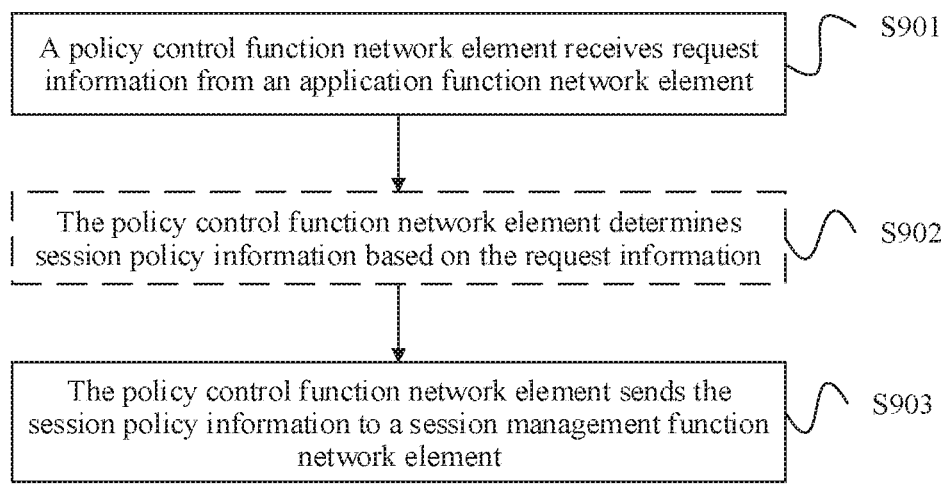
FIG. 9 is a flowchart of another session processing method according to an embodiment of this application.

FIG. 9 is a flowchart of another session processing method according to an embodiment of this application. The method may be used in a scenario in which user equipment performs session processing based on a continuity requirement of an APP. As shown in FIG. 9, the method may include the following steps.

S901: A policy control function network element receives request information from an application function network element. The request information includes a continuity requirement of an APP, and the request information is for determination of session policy information.

For example, the policy control function network element is the PCF network element 207 in FIG. 2, and the application function network element is the AF network element 208 in FIG. 2.

For step S901, refer to the description of step S301 in FIG. 3. Details are not described herein again.

S903: The policy control function network element sends the session policy information to a session management function network element. The session policy information is for processing of a session.

For example, the session management function device is the SMF network element 206 in FIG. 2.

For the session policy information, refer to the descriptions of the second policy information in FIG. 3. Details are not described herein again.

Therefore, according to the method in this embodiment of the present invention, based on different continuity requirements of the APP in the request information, the policy control function network element may provide, for the session management function network element, the session policy information, and the session management function network element processes the session based on the session policy information on a premise that the session meets the continuity requirement of the APP, so that a session path can be shortened, and transmission efficiency is improved.

Optionally, before step 903, the policy control function network element may perform the following S902.

S902: The policy control function network element determines the session policy information based on the request information.

For descriptions of determining, by the policy control function network element, the session policy information based on the request information in step S902, refer to the descriptions of determining, by the policy control function network element, the second policy information based on the request information in step S304 in FIG. 3. Details are not described herein again.

Figure 10:
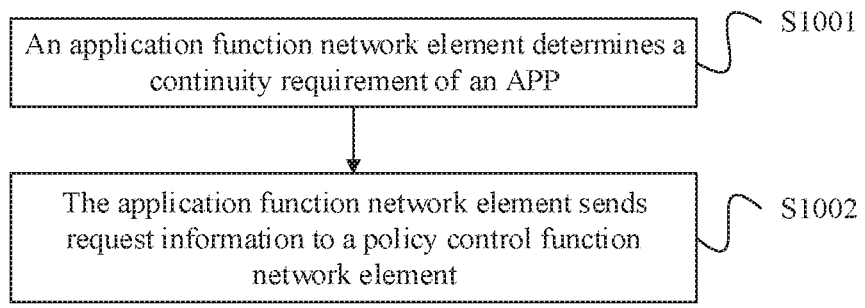
FIG. 10 is a flowchart of another session processing method according to an embodiment of this application.

FIG. 10 is a flowchart of another session processing method according to an embodiment of this application. The method may be used in a scenario in which an application function network element sends a continuity requirement of an APP to a policy control function network element. As shown in FIG. 10, the method may include the following steps.

S1001: An application function network element determines a continuity requirement of an APP. The continuity requirement of the APP includes that the APP does not need continuity, the APP needs IP address continuity, or the APP supports upper-layer service continuity.

For example, the application function network element is the AF network element 208 in FIG. 2.

S1002: The application function network element sends request information to a policy control function network element. The request information includes the continuity requirement of the APP.

For example, the policy control function network element is the PCF network element 207 in FIG. 2.

The request information is for indicating the continuity requirement for communication between user equipment and a server of the APP after the user equipment starts the APP. For example, the continuity requirement of the APP may also be referred to as a continuity requirement of the APP server.

For the request information, refer to the specific descriptions in FIG. 3. Details are not described herein again.

Therefore, according to the method in this embodiment of the present invention, the application function network element may provide the continuity requirement of the APP for the policy control function network element, so that first policy information sent by the policy control function network element to user equipment is related to the continuity requirement of the APP. A session reused or newly established by the user equipment based on the first policy information meets the continuity requirement for communication between the user equipment and the server of the APP, and therefore, user experience is improved.

Optionally, the request information is further for determination of second policy information. The second policy information is for processing of a session.

For example, the second policy information may be a multi-homing offload policy, a ULCL offload policy, a multi-session policy, or a policy of keeping an anchor user plane function network element for accessing the APP server unchanged. For a step of determining, by the policy control function network element, the second policy information based on the request information, refer to the descriptions in step S304 in FIG. 3. Details are not described herein again.

Therefore, according to the foregoing solution, the application function network element may provide the continuity requirement of the APP for the policy control function network element, so that the second policy information sent by the policy control function network element to the user equipment is related to the continuity requirement of the APP. After processing the session based on the second policy information, the user equipment still meets the continuity requirement of the APP, and therefore, user experience is improved. In addition, in a process of processing the session based on the second policy information, the network uses a new UPF network element, so that a transmission path from the user equipment to the APP server is shorter, and therefore, a service flow transmission time when the user equipment communicates with the APP server is saved, and transmission efficiency is improved.

Alternatively, the request information is for determination of session policy information, and the session policy information is for processing of a session.

Therefore, the application function network element may provide the continuity requirement of the APP for the policy control function network element, so that the session policy information sent by the policy control function network element to the session management function network element is related to the continuity requirement of the APP. The session management function network element processes the session based on the session policy information on a premise that the session meets the continuity requirement of the APP, so that a session path may be shortened, and transmission efficiency is improved.

Optionally, the continuity requirement includes that the APP does not need continuity, the APP needs IP address continuity, or the APP supports upper-layer service continuity. Therefore, based on different continuity requirements of the APP in the request information, the policy control function network element may provide, for the session management function network element, the session policy information related to the continuity requirement of the APP.

Optionally, when the continuity requirement is that the APP needs IP address continuity, the request information further includes indication information for indicating whether the APP server supports context migration with another APP server. Therefore, the policy control function network element may provide the session policy information for the session management function network element based on the requirement that the APP needs IP address continuity and the indication information indicating whether the APP server supports context migration with another APP server that are in the request information.

In the foregoing embodiments provided in this application, the solutions of the session processing method provided in the embodiments of this application are separately described from a perspective of the network elements and from a perspective of interaction between the network elements. It may be understood that, to implement the foregoing functions, each network element such as the policy control function network element, the application function network element, or the session management function network element includes a corresponding hardware structure and/or software module for performing each function. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11A:
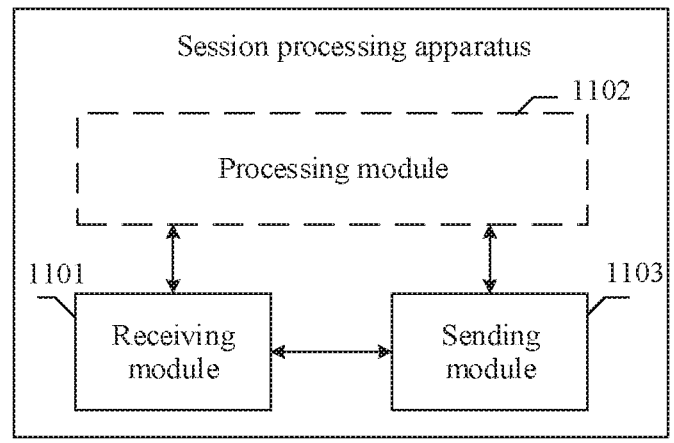
FIG. 11A and FIG. 11B are schematic structural diagrams of a session processing apparatus according to embodiments of this application.

For example, when the foregoing network elements implement the corresponding functions by using the software modules, the session processing apparatus may include a receiving module 1101 and a sending module 1103, as shown in FIG. 11A. Optionally, the session processing apparatus further includes a processing module 1102.

In an embodiment, the session processing apparatus may be configured to perform an operation of the policy control function network element in FIG. 3. For example, the receiving module 1101 is configured to receive request information from an application function network element, where the request information includes a continuity requirement of an APP; and the sending module 1103 is configured to send first policy information to user equipment, where the first policy information includes an SSC mode of the APP, the first policy information is associated with the continuity requirement of the APP, and the first policy information is for determining whether to reuse or newly establish a session.

Therefore, the user equipment may obtain the first policy information related to the continuity requirement of the APP. The user equipment performs session processing based on the first policy information when starting the APP: If a session that meets the SSC mode in the first policy information exists in existing sessions of the user equipment, the user equipment reuses the session; or if no session that meets the SSC mode in the first policy information exists in the existing sessions of the user equipment, the user equipment directly initiates a session establishment procedure. Because the first policy information is related to the continuity requirement of the APP, the session reused or newly established by the user equipment based on the first policy information meets the continuity requirement for communication between the user equipment and a server of the APP, and therefore, user experience is improved.

Optionally, the processing module 1102 is configured to determine the SSC mode of the APP based on the request information. The continuity requirement of the APP includes that the APP does not need continuity, the APP needs IP address continuity, or the APP supports upper-layer service continuity.

Optionally, when the continuity requirement of the APP is that the APP does not need continuity, the processing module 1102 is configured to determine that the SSC mode of the APP is a second mode. In the second mode, a service connection between the APP server of the APP and the user equipment is allowed to be disconnected.

Optionally, when the continuity requirement of the APP is that the APP does not need continuity, the sending module 1103 is configured to send second policy information to a session management function network element. The second policy information is a multi-homing offload policy or a ULCL offload policy.

Optionally, when the continuity requirement of the APP is that the APP supports upper-layer service continuity, the processing module 1102 is configured to determine that the SSC mode of the APP is a third mode. In the third mode, a service connection between the APP server and the user equipment is reserved, and an IP address of the APP is allowed to change.

Optionally, when the continuity requirement of the APP is that the APP supports upper-layer service continuity, the sending module 1103 is configured to send second policy information to a session management function network element. The second policy information is a multi-homing offload policy.

Optionally, when the continuity requirement of the APP is that the APP needs IP address continuity, the processing module 1102 is configured to determine that the SSC mode of the APP is a first mode. In the first mode, a session connection between the APP server and the user equipment is reserved, and an IP address of the APP remains unchanged.

Optionally, the request information further includes indication information for indicating whether the APP server supports context migration with another APP server.

Optionally, when the continuity requirement of the APP is that the APP needs IP address continuity and the indication information indicates that the APP server supports context migration with the another APP server, the sending module 1103 is configured to send second policy information to the session management function network element, and the second policy information is a ULCL offload policy.

Optionally, when the continuity requirement of the APP is that the APP needs IP address continuity and the indication information indicates that the APP server does not support context migration with the another APP server, the sending module 1103 is configured to send second policy information to the session management function network element, and the second policy information is to keep an anchor user plane function network element for accessing the APP server unchanged.

In addition, the receiving module 1101, the processing module 1102, and the sending module 1103 in the session processing apparatus may further implement other operations or functions of the policy control function network element in the foregoing methods. Details are not described herein again.

In another embodiment, the session processing apparatus shown in FIG. 11A may alternatively be configured to perform an operation of the policy control function network element in FIG. 9. For example, the receiving module 1101 is configured to receive request information from an application function network element, where the request information includes a continuity requirement of an APP, and the request information is for determination of session policy information; and the sending module 1103 is configured to send the session policy information to a session management function network element, where the session policy information is for processing of a session.

Therefore, based on different continuity requirements of the APP in the request information, the policy control function network element may provide, for the session management function network element, the session policy information, and the session management function network element processes the session based on the session policy information on a premise that the session meets the continuity requirement of the APP, so that a session path can be shortened, and transmission efficiency is improved.

Optionally, the processing module 1102 is configured to determine the session policy information based on the request information, where the continuity requirement in the request information includes that the APP does not need continuity, the APP needs IP address continuity, or the APP supports upper-layer service continuity.

Optionally, when the continuity requirement of the APP is that the APP does not need continuity, the processing module 1102 is configured to determine that the session policy information is a multi-homing offload policy or a ULCL offload policy.

Optionally, when the continuity requirement of the APP is that the APP supports upper-layer service continuity, the processing module 1102 is configured to determine that the session policy information is a multi-homing offload policy.

Optionally, when the continuity requirement of the APP is that the APP needs IP address continuity, the request information further includes indication information for indicating whether the APP server supports context migration with another APP server.

Optionally, when the continuity requirement of the APP is that the APP needs IP address continuity and the indication information indicates that the APP server supports context migration with the another APP server, the processing module 1102 is configured to determine that the session policy information is a ULCL offload policy.

Optionally, when the continuity requirement of the APP is that the APP needs IP address continuity and the indication information indicates that the APP server does not support context migration with the another APP server, the processing module 1102 is configured to determine that the session policy information is to keep an anchor user plane function network element for accessing the APP server unchanged.

In addition, the receiving module 1101, the processing module 1102, and the sending module 1103 in the session processing apparatus may further implement other operations or functions of the policy control function network element in the foregoing methods. Details are not described herein again.

In another embodiment, the session processing apparatus shown in FIG. 11A may alternatively be configured to perform an operation of the application function network element in FIG. 10. For example, the processing module 1102 is configured to determine a continuity requirement of an APP; and the sending module 1103 is configured to send request information to a policy control function network element, where the request information includes the continuity requirement.

The request information is for determination of first policy information. The first policy information includes an SSC mode of the APP, the first policy information is associated with the continuity requirement of the APP, and the first policy information is for determining whether to reuse or newly establish a session.

Therefore, the application function network element may provide the continuity requirement of the APP for the policy control function network element, so that the first policy information sent by the policy control function network element to user equipment is related to the continuity requirement of the APP. The session reused or newly established by the user equipment based on the first policy information meets the continuity requirement for communication between the user equipment and a server of the APP, and therefore, user experience is improved.

Optionally, the request information is further for determination of second policy information. The second policy information is for processing a session.

Alternatively, the request information is for determination of session policy information, and the session policy information is for processing a session.

Therefore, the application function network element may provide the continuity requirement of the APP for the policy control function network element, so that the session policy information sent by the policy control function network element to a session management function network element is related to the continuity requirement of the APP. The session management function network element processes the session based on the session policy information on a premise that the session meets the continuity requirement of the APP, so that a session path may be shortened, and transmission efficiency is improved.

Optionally, the continuity requirement includes that the APP does not need continuity, the APP needs IP address continuity, or the APP supports upper-layer service continuity.

Optionally, when the continuity requirement is that the APP needs IP address continuity, the request information further includes indication information for indicating whether the APP server supports context migration with another APP server.

In addition, the receiving module 1102, the sending module 1103 in the session processing apparatus may further implement other operations or functions of the application function network element in the foregoing methods. Details are not described herein again.

Figure 11B:
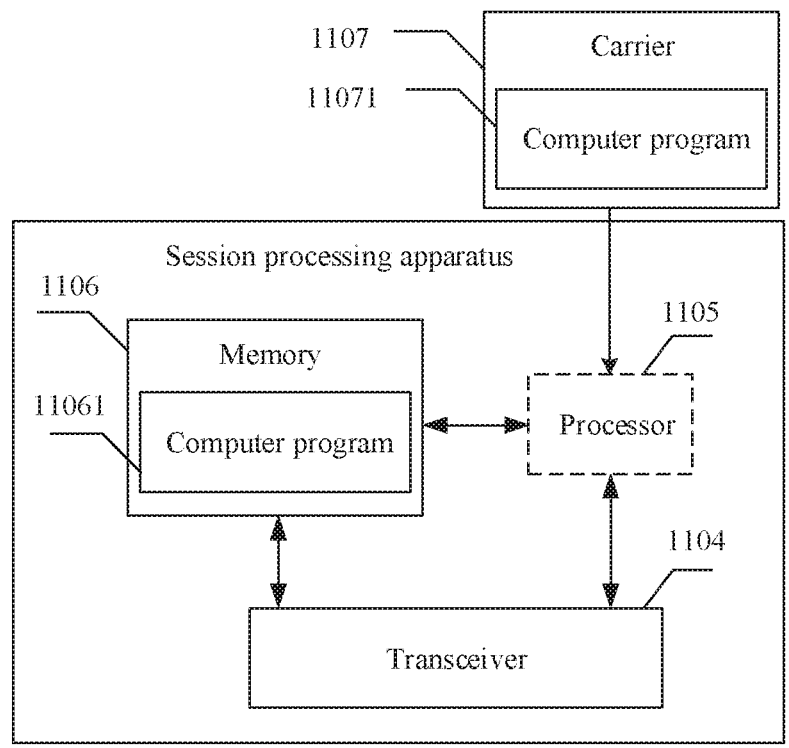

FIG. 11B is another possible schematic structural diagram of the session processing apparatus in the foregoing embodiment. The session processing apparatus includes a transceiver 1104 and a processor 1105, as shown in FIG. 11B. For example, the processor 1105 may be a general-purpose microprocessor, a data processing circuit, an application-specific integrated circuit (application-specific integrated circuit, ASIC), or a field programmable gate array (field-programmable gate arrays, FPGA) circuit. The session processing apparatus may further include a memory 1106. For example, the memory is a random access memory (random access memory, RAM). The memory is coupled to the processor 1105, and store a computer program 11061 that is necessary for the session processing apparatus. Optionally, the session processing method in the foregoing embodiment further provides a carrier 1107. The carrier stores a computer program 11071 for the session processing apparatus to run, and the computer program 11071 may be loaded into the processor 1105. The carrier may be an optical signal, an electrical signal, an electromagnetic signal, or a computer-readable storage medium (for example, a hard disk). When the computer program 11061 or 11071 is run on a computer (for example, the processor 1105), the computer may be enabled to perform the foregoing methods.

For example, in an embodiment, the processor 1105 is configured to perform another operation or function of the policy control function network element in FIG. 3 or FIG. 9. The transceiver 1104 is configured to implement communication between the session processing apparatus and an application function network element/user equipment/a session management function network element.

In another embodiment, the processor 1105 is configured to perform another operation or function of the application function network element in FIG. 10. The transceiver 1104 is configured to implement communication between the session processing apparatus and a policy control function network element.

The controller/processor configured to perform functions of the session processing apparatus in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the session processing apparatus. Certainly, the processor and the storage medium may alternatively exist in the session processing apparatus as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A session processing method, comprising:
   receiving, by a policy control function apparatus from an application function apparatus, a request, wherein the request comprises a continuity requirement of an application indicating whether an internet protocol (IP) address used by a user equipment to access a server of the application remains unchanged;
   determining, based on the continuity requirement, that the IP address used by the user equipment to access the server of the application remains unchanged;
   in response to determining that the IP address remains unchanged, determining, by the policy control function apparatus, policy information indicating that an anchor user plane function network element for accessing the server of the application remains unchanged;
   sending, by the policy control function apparatus, the policy information to a session management function apparatus;
   receiving, by the session management function apparatus, the policy information from the policy control function apparatus; and
   processing, by the session management function apparatus, a session according to the policy information.

2. The method according to claim 1, wherein sending the policy information to the session management function apparatus comprises:
   sending, by the policy control function apparatus, a policy control and charging (PCC) rule to the session management function apparatus, wherein the policy information is included in the PCC rule.

3. The method according to claim 1, further comprising:
   determining, by the application function apparatus, the continuity requirement of the application; and
   sending, by the application function apparatus, the request to the policy control function apparatus.

4. The method according to claim 1, wherein the request further comprises indication information indicating that the server of the application does not support context migration with another application server.

5. A system, comprising a policy control function apparatus and a session management function apparatus, wherein:
   the policy control function apparatus is configured to:
      receive from an application function apparatus, a request, wherein the request comprises a continuity requirement of an application indicating whether an internet protocol (IP) address used by a user equipment to access a server of the application remains unchanged;
      determine, based on the continuity requirement, that the IP address used by the user equipment to access the server of the application remains unchanged;
      in response to determining that the IP address remains unchanged, determine policy information indicating that an anchor user plane function network element for accessing the server of the application remains unchanged; and
      send the policy information to the session management function apparatus; and
   the session management function apparatus is configured to receive the policy information from the policy control function apparatus; and process a session according to the policy information.

6. The system according to claim 5, wherein the policy control function apparatus is configured to send a policy control and charging (PCC) rule to the session management function apparatus, wherein the policy information is included in the PCC rule.

7. The system according to claim 5, further comprising the application function apparatus, wherein:
   the application function apparatus is configured to determine the continuity requirement of the application; and
   send the request to the policy control function apparatus.

8. The system according to claim 5, wherein the request further comprises indication information indicating that the server of the application does not support context migration with another application server.

9. A session processing method, comprising:
   receiving, by a policy control function apparatus from an application function apparatus, a request, wherein the request comprises a continuity requirement of an application indicating whether an internet protocol (IP) address used by a user equipment to access a server of the application remains unchanged;
   determining, based on the continuity requirement, that the IP address used by the user equipment to access the server of the application remains unchanged;
   in response to determining that the IP address remains unchanged, determining, by the policy control function apparatus, policy information indicating that an anchor user plane function network element for accessing the server of the application remains unchanged; and
   sending, by the policy control function apparatus, the policy information to a session management function apparatus for session processing.

10. The method according to claim 9, wherein the sending the policy information to the session management function apparatus comprises:
    sending, by the policy control function apparatus, a policy control and charging (PCC) rule to the session management function apparatus, wherein the policy information is included in the PCC rule.

11. The method according to claim 9, wherein the request further comprises indication information indicating that the server of the application does not support context migration with another application server.

12. An apparatus, comprising:
    at least one processor; and
    one or more memories coupled to the at least one processor and storing programming instructions for execution by the at least one processor to perform operations comprising:
       receiving, a request from an application function apparatus, wherein the request comprises a continuity requirement of an application indicating whether an internet protocol (IP) address used by a user equipment to access a server of the application remains unchanged;

determining, based on the continuity requirement, that the IP address used by the user equipment to access the server of the application remains unchanged;

in response to determining that the IP address remains unchanged, determining policy information indicating that an anchor user plane function network element for accessing the server of the application remains unchanged; and sending the policy information to a session management function apparatus for session processing.

13. The apparatus according to claim 12, wherein the operations further comprising:

sending a policy control and charging (PCC) rule to the session management function apparatus, wherein the policy information is included in the PCC rule.

14. The apparatus according to claim 12, wherein the request further comprises indication information indicating that the server of the application does not support context migration with another application server.

\* \* \* \* \*